United States Patent [19]
Taylor

[11] Patent Number: 6,161,571
[45] Date of Patent: Dec. 19, 2000

[54] MODULATING RELIEF VALVE

[75] Inventor: Wesley Taylor, Bethany, Okla.

[73] Assignee: The Living Trust of Eleanor A. Taylor, Oklahoma City, Okla.

[21] Appl. No.: 09/312,362

[22] Filed: May 14, 1999

[51] Int. Cl.[7] .................................................. G05D 16/16
[52] U.S. Cl. ........................................... 137/492; 137/488
[58] Field of Search ..................................... 137/488, 492

[56] References Cited

U.S. PATENT DOCUMENTS

| | | |
|---|---|---|
| 2,217,087 | 10/1940 | Whitenack . |
| 2,477,247 | 7/1949 | Haberland . |
| 2,504,720 | 4/1950 | Nixon . |
| 2,571,154 | 10/1951 | Mercier . |
| 2,609,832 | 9/1952 | Smith . |
| 2,619,109 | 11/1952 | Garrett et al. . |
| 2,649,115 | 8/1953 | Deardorff . |
| 2,877,791 | 3/1959 | Rich . |
| 2,923,307 | 2/1960 | Grogan . |
| 2,965,132 | 12/1960 | Couffer, Jr. et al. . |
| 3,010,691 | 11/1961 | Canfield . |
| 3,030,778 | 4/1962 | Taylor . |
| 3,099,281 | 7/1963 | Watrous et al. . |
| 3,201,042 | 8/1965 | Norman et al. . |
| 3,211,174 | 10/1965 | Weise et al. . |
| 3,221,765 | 12/1965 | Farris . |
| 3,244,190 | 4/1966 | Taylor ........................................ 137/85 |
| 3,294,111 | 12/1966 | Abercrombie et al. . |
| 3,304,951 | 2/1967 | Farris . |
| 3,414,008 | 12/1968 | Greenwood . |
| 3,419,030 | 12/1968 | Gratzmuller . |
| 3,512,560 | 5/1970 | Weise . |
| 3,568,706 | 3/1971 | Weise . |
| 3,664,362 | 5/1972 | Weise . |
| 3,771,553 | 11/1973 | Huet . |
| 3,896,843 | 7/1975 | Millar et al. . |
| 3,977,423 | 8/1976 | Clayton . |
| 4,250,913 | 2/1981 | Scull . |
| 4,349,885 | 9/1982 | Thompson . |
| 4,384,590 | 5/1983 | Friend . |
| 4,390,041 | 6/1983 | Reip . |

(List continued on next page.)

*Primary Examiner*—Gerald A. Michalsky
*Attorney, Agent, or Firm*—Brinks Hofer Gilson & Lione

[57] ABSTRACT

A modulating relief valve comprising a main relief valve and a dome pressure control system. The main relief valve has an inlet subject to system pressure, an outlet, a valve member normally sealing the inlet, a piston that rises and falls wit the valve member, and a dome adjacent to the piston, the dome having a dome pressure. The dome pressure control system is attached to the main relief valve. In one embodiment, the dome pressure control system has a body, a beam inside the body attached to the body at a pivot point, an input pressure module creating a first force on the beam, the first force being related to the system pressure and tending to rotate the beam in a first direction, a mechanism for setting a set-point pressure, the set-point pressure creating a second force on the beam, tending to rotate the beam in a second direction opposite the first direction, a control valve that exerts an additional force on the beam tending to rotate the beam in the first direction, the additional force having one component that is related to the dome pressure, the control valve allowing dome pressure to be exhausted when the beam is rotated in the first direction thereby allowing the main valve member to open, and the control valve allowing system pressure to pressurize the dome when the beam is rotated in the second direction. In another embodiment, the dome pressure control system further includes a negative feedback system. In another embodiment, the dome pressure control system does not include a beam and is instead configured in a stacked arrangement.

22 Claims, 5 Drawing Sheets

U.S. PATENT DOCUMENTS

| | | | |
|---|---|---|---|
| 4,410,005 | 10/1983 | Reip . | |
| 4,445,531 | 5/1984 | Powell . | |
| 4,446,886 | 5/1984 | Taylor et al. | 137/516.29 |
| 4,450,869 | 5/1984 | Acker . | |
| 4,462,420 | 7/1984 | Cullie . | |
| 4,530,376 | 7/1985 | Chatterjea . | |
| 4,566,486 | 1/1986 | Taylor et al. | 137/469 |
| 4,586,533 | 5/1986 | Estes . | |
| 4,609,008 | 9/1986 | Anderson, Jr. et al. . | |
| 4,610,270 | 9/1986 | Acker . | |
| 4,632,143 | 12/1986 | McNeely . | |
| 4,649,803 | 3/1987 | Abel | 137/627.5 X |
| 4,682,495 | 7/1987 | McNeely . | |
| 4,708,164 | 11/1987 | Scallan . | |
| 4,761,999 | 8/1988 | Thompson . | |
| 4,791,955 | 12/1988 | Reip . | |
| 4,799,506 | 1/1989 | Taylor | 137/469 |
| 4,858,642 | 8/1989 | Fain, Jr. . | |
| 4,881,571 | 11/1989 | Reip . | |
| 4,905,727 | 3/1990 | Gavrila . | |
| 4,917,144 | 4/1990 | Giles . | |
| 4,932,434 | 6/1990 | Taylor | 137/469 |
| 4,957,136 | 9/1990 | Gavrila . | |
| 5,027,852 | 7/1991 | McNeely | 137/488 |
| 5,046,524 | 9/1991 | Crichton, Jr. . | |
| 5,056,550 | 10/1991 | Mooney . | |
| 5,163,471 | 11/1992 | Powell . | |
| 5,370,151 | 12/1994 | Smart . | |
| 5,378,116 | 1/1995 | Bennitt et al. . | |
| 5,564,673 | 10/1996 | Pieren . | |
| 5,623,962 | 4/1997 | Danzy et al. . | |
| 5,725,015 | 3/1998 | Theodos et al. . | |
| 5,735,308 | 4/1998 | Yokota et al. . | |

MODULATING RELIEF VALVE

BACKGROUND OF THE INVENTION

This invention relates to a modulating relief valve for use on a pressure vessel. Relief valves are commonly used on pressure vessels to prevent pressure inside the vessel from exceeding a limit at which the vessel could explode or otherwise suffer damage.

Presently, many relief valves are of the "snap" variety. See, For example, U.S. Pat. No. 4,291,721. Snap relief valves have only two operating positions: fully open and fully closed. That is, when the pressure inside the vessel reaches the limit, the snap relief valve opens to a fully open position. This causes excessive discharge of fluid and excessive wear and tear on the relief valve.

Some known relief valves are of the "modulating" variety. Modulating relief valves open gradually and proportionally to an amount by which the pressure in the vessel exceeds a predetermined limit. See, for example, U.S. Pat. Nos. 4,586,533, 4,609,008, and 4,917,144. The known modulating relief valves have certain problems associated with them. They lack precision in modulation due to friction and lack of precise negative feedback, and they cannot handle pressures above a certain point. Some known modulating relief valves have multiple pistons with rubber o-rings around those pistons. Those o-rings wear down, causing the rubber to vulcanize inside the relief valve. Some known modulating relief valves have leakage resulting from the moving parts. Also, some known modulating relief valves are difficult and expensive to manufacture.

Therefore, what is needed is a modulating relief valve with improved precision in its modulation that is capable of handling high pressures. Also needed is a type of valve that uses fewer rubber o-rings around moving parts, that has less leakage, and that is easier and less expensive to manufacture.

BRIEF SUMMARY OF THE INVENTION

The present invention provides a modulating relief valve for use on a pressure vessel having a system pressure. In one aspect of the invention, modulating relief valve comprises a main relief valve and a dome pressure control system. The main relief valve has an inlet subject to system pressure, an outlet, a valve member normally sealing the inlet, a piston that rises and falls with the valve member, and a dome adjacent to the piston, the dome having a dome pressure.

The dome pressure control system is attached to the main relief valve, and in one embodiment, it has a body, a beam inside the body attached to the body at a pivot point, an input pressure module creating a first force on the beam, the first force being related to the system pressure and tending to rotate the beam in a first direction, a mechanism for setting a set-point pressure, the set-point pressure creating a second force on the beam, tending to rotate the beam in a second direction opposite the first direction, a control valve that exerts an additional force on the beam tending to rotate the beam in the first direction, the additional force having one component that is related to the dome pressure, the control valve allowing dome pressure to be exhausted when the beam is rotated in the first direction thereby allowing the main valve member to open, and the control valve allowing system pressure to pressurize the dome when the beam is rotated in the second direction.

In another aspect of the invention, the dome pressure control system further comprises a negative feedback system. The feedback system has a spring with a first end creating a third force on the beam tending to rotate the beam in the second direction, and a second end acting against a rod attached to the piston. When the piston rises, the rod compresses the spring, and the spring pushes the beam in the second direction to prevent exhaust of dome pressure until the system pressure causes the piston to rise further. This negative feedback system improves the accuracy of the modulation.

In another aspect of the invention, the dome pressure control system does not include a beam. Instead, the dome pressure control system includes a body, an input pressure module at least partially in the body creating a first force proportional to the system pressure and tending to allow dome pressure to exhaust, a mechanism for setting a set-point pressure, the set-point pressure creating a second force tending to prevent dome pressure exhaust, and a control valve at least partially in the body that exerts an additional force tending to allow exhaust of the dome pressure. The additional force has one component that is proportional to the dome pressure, and the control valve allows dome pressure to be exhausted when there is a difference between the system pressure and the set-point pressure such that the first force and the additional force exceed the second force, thereby allowing the main valve member to open an amount, the amount the main valve opens being proportional to the difference between the system pressure and the set-point pressure. The control valve also allows system pressure to pressurize the dome when the second force exceeds the sum of the first force and the additional force.

In still another aspect of the invention, the input pressure module comprises an inlet port in fluid communication with the system pressure, an annular flexible disk, and a sealing member resting on the disk, such that the disk and sealing member rise and fall together with changes in system pressure without leakage, and such that the system pressure applies an input force against the disk and sealing member, which in turn applies the first force tending to allow dome pressure to exhaust. This input pressure module is capable of working with pressures as high as 3750 psi with zero leakage.

In a preferred embodiment of this invention, various components are made with modern plastics that are easy and relatively inexpensive to fabricate.

BRIEF DESCRIPTION OF SEVERAL VIEWS OF THE DRAWINGS

FIG. 7 is a cross-sectional view of a second preferred embodiment of a modulating relief valve having a beam.

DETAILED DESCRIPTION OF THE DRAWINGS AND PREFERRED EMBODIMENTS OF THE INVENTION

Figures 1, 2:
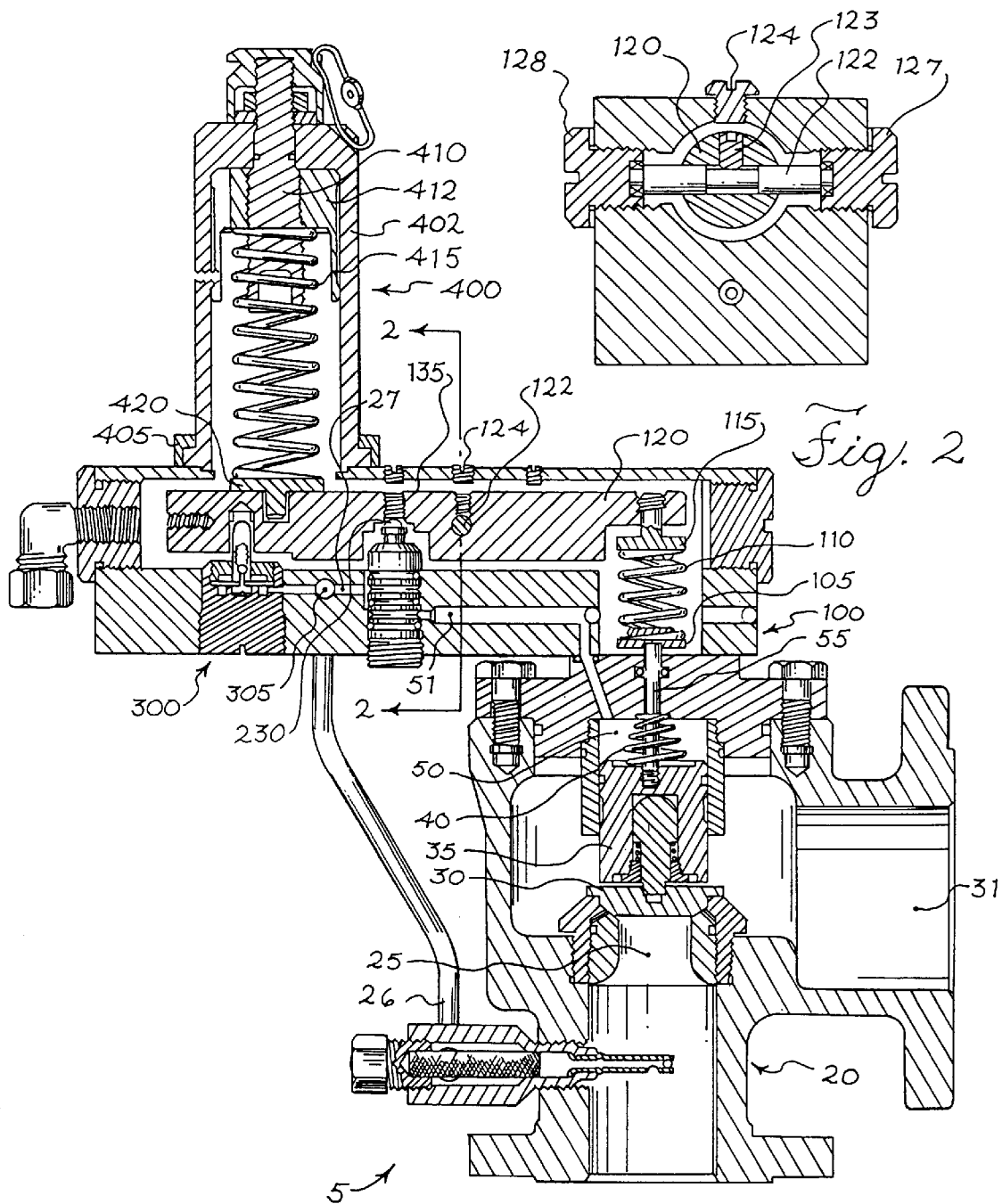
FIG. 1 is a cross-sectional view of a first preferred embodiment of a modulating relief valve attached to a pressure vessel.
FIG. 2 is a cross-sectional view of the beam mounted in the modulating relief valve taken along line 2—2 of FIG. 1.
Figure 8:
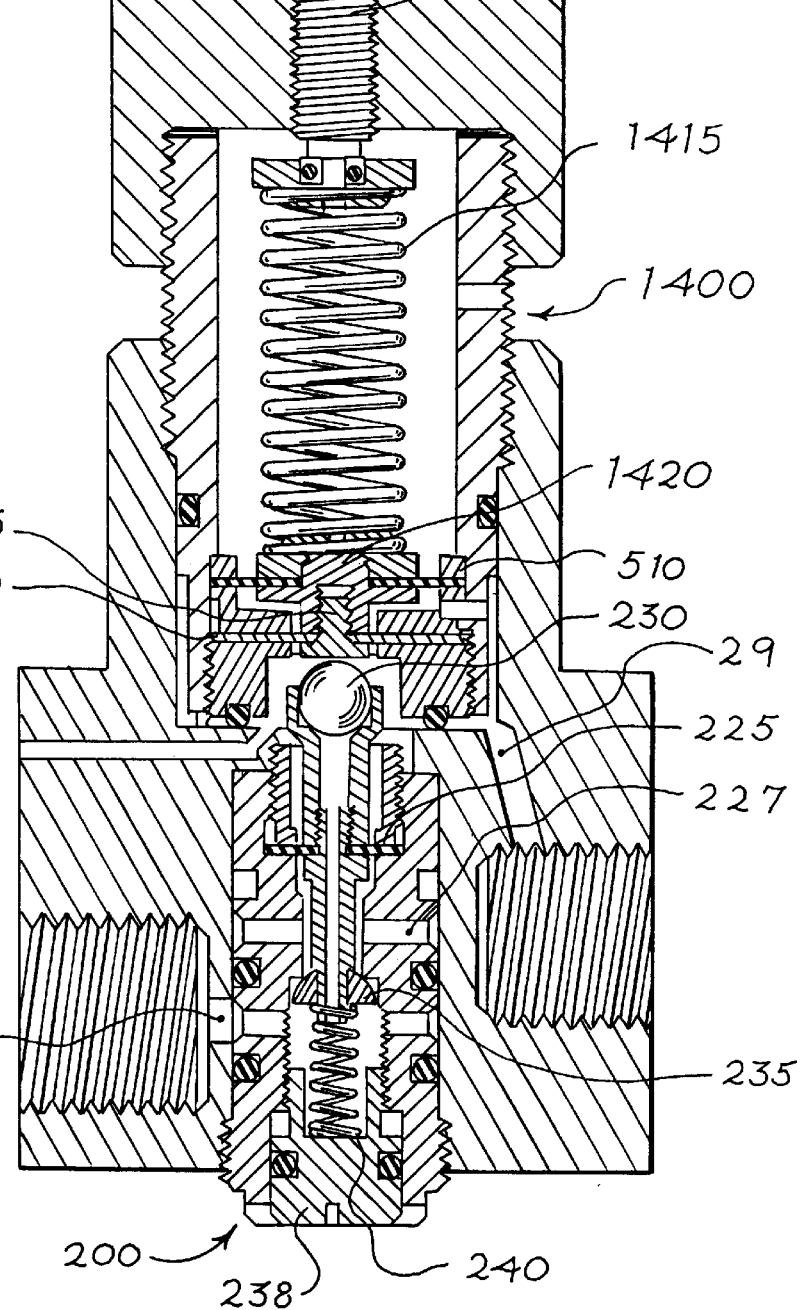
FIG. 8 is a cross-sectional view of a third preferred embodiment of a modulating relief valve in a stacked arrangement.

A first preferred embodiment of a modulating relief valve with a negative feedback spring is depicted in FIG. 1. FIGS. 2–6 show preferred subassemblies for the embodiment of FIG. 1. FIG. 7 shows a second preferred embodiment of a modulating relief valve without a negative feedback spring. The embodiment shown in FIG. 7 uses the subassemblies shown in FIGS. 2–6. FIG. 8 is an third preferred embodiment of a modulating relief valve in a stacked arrangement. The embodiment shown in FIG. 8 uses the subassemblies depicted in FIGS. 5–6. Each of these Figures is intended merely to exemplify particular embodiments of the claimed invention, not to limit the scope of claimed invention.

Referring to FIG. 1, main relief valve 20 is mounted on top of a pressure vessel, which is not shown. The mechanism used for mounting any valve part onto another can include threading one piece into another, bolting or screwing one piece into another, or other well known mechanisms for mounting. Body 100 of a dome pressure control system is mounted on main relief valve 20. Body 100 contains beam 120, input pressure module 300, control valve 200, and negative feed back system comprising rod 55 and spring 110. Set-point bonnet 400, which is a mechanism for setting a setpoint pressure, is mounted on body 100.

Main relief valve 20 has inlet 25, which contains fluid and acts; as a source for system pressure in modulating relief valve 5. That is, input pressure module 300 senses system pressure in inlet 25 through tubing 26, inlet port 305, and passageway 27. Inlet 25 also supplies system pressure to control valve 200 through passageway 27.

Main relief valve 20 has outlet 31 through which system pressure can exhaust to atmosphere. Main relief valve 20 has a valve member 30 that has an effective surface area normally sealing inlet 25 so there is no exhaust of system pressure through outlet 31, as shown. However, valve member 30 can rise from its sealing position under conditions described in the section "Description of the Operation of the Preferred Embodiments."

Piston 35 rises and falls with valve member 30 in main relief valve 20. Main relief valve 20 also has dome 50 that is adjacent to piston 35. Spring 40 resides in dome 50 and acts against piston 35 to keep it closed. Dome 50 has a dome pressure. Piston 35 has an effective surface area in contact with dome 50, and this effective surface area is larger than the effective surface area of valve member 30. The importance of the relationship between the effective surface area of valve member 30 and the effective surface area of piston 35 is described in the section "Description of the Operation of the Preferred Embodiments."

Modulating relief valve 5 has a dome pressure control system that comprises body 100, beam 120, input pressure module 300 (which applies a first force to beam 120), a mechanism for setting a set-point pressure (in this case, set-point bonnet 400), control valve 200, and a negative feedback system comprising rod 55 and spring 110.

Set-point bonnet 400, which is a preferred mechanism for setting a set-point pressure, has bonnet housing 402 that is affixed to body 100 by the clamping ring 405 and allen head machine screws. Bonnet housing 402 can also be affixed to body 100 by other means well known in the art. Bonnet housing 402 has set screw 410 at least partially inside bonnet housing 402. Set screw 410 pushes against set-point spring 415, which in turn presses against pedestal 420 mounted on beam 120. The pedestal applies a second force to beam 120, tending to cause beam 120 to rotate in a counterclockwise direction about pivot rod 122. This motion prevents dome pressure from exhausting.

An allen head pocket permits rotation of set screw 410 so that adjustment guide bushing 412 travels up and down within the body to apply more or less compression to the set-point spring 415. Adjustment guide bushing 412 cannot rotate within bonnet housing 402 due to a body pin running in a slot in guide bushing 412.

The negative feedback system comprises rod 55 and spring 110. Rod 55 is attached at one end to pedestal 105 and is attached at another end to piston 35. Spring 110 rests between pedestal 105 and pedestal 115, pedestal 115 being attached to beam 120. When rod 55 rises to allow exhaust of main relief valve 20, spring 110 compresses and applies a third force on team 120, tending to rotate beam 120 counterclockwise about pivot rod 122. This rotation acts to prevent dome pressure from exhausting. The negative feedback system improves the accuracy of the modulation by, among other things, reducing the role that friction of piston 35 plays in the modulation.

Spring 110 has a spring rate that influences the amount that system pressure must exceed the set-point pressure to fully open main relief valve 20. Those skilled in the art will recognize that there are many methods for changing the spring rate of a coil spring, such as shorting out coils. All known methods are within the scope of this invention.

The remaining components of the dome pressure control system are more fully described in following sections that relate to more detailed drawings of those components. The way the dome pressure control system works in conjunction with the main relief valve is described in the section "Description of the Operation of the Preferred Embodiments."

Referring to FIG. 2, beam 120 is supported in body 100 at a pivot point. Beam 120 has a width and a longitudinal axis, and pivot rod 122 extends through the width of beam 120 in a direction that is substantially perpendicular to the longitudinal axis of beam 120. Pivot rod 122 is supported in body 100 by precision pivot ball bearings in mounting screws 127 and 128. Alternatively, pivot ball bearings can be replaced With other relatively frictionless pivot members such as "flexure" pivots or other well known mechanisms such as mechanical fasteners including bolts, nails, screws, and bearing mounting screws. Set screw 123 tightens beam 120 against pivot rod 122. Access to tighten set screw 123 is through sealing cap 124. Once mounted in body 100, beam 120 can rotate clockwise and counterclockwise about pivot rod 122 according to the various forces acting on beam 120. It is preferred that body 100 contain a cavity large enough such that small angular motion of beam 120 does not cause beam 120 to rub against body 110.

Figure 3:
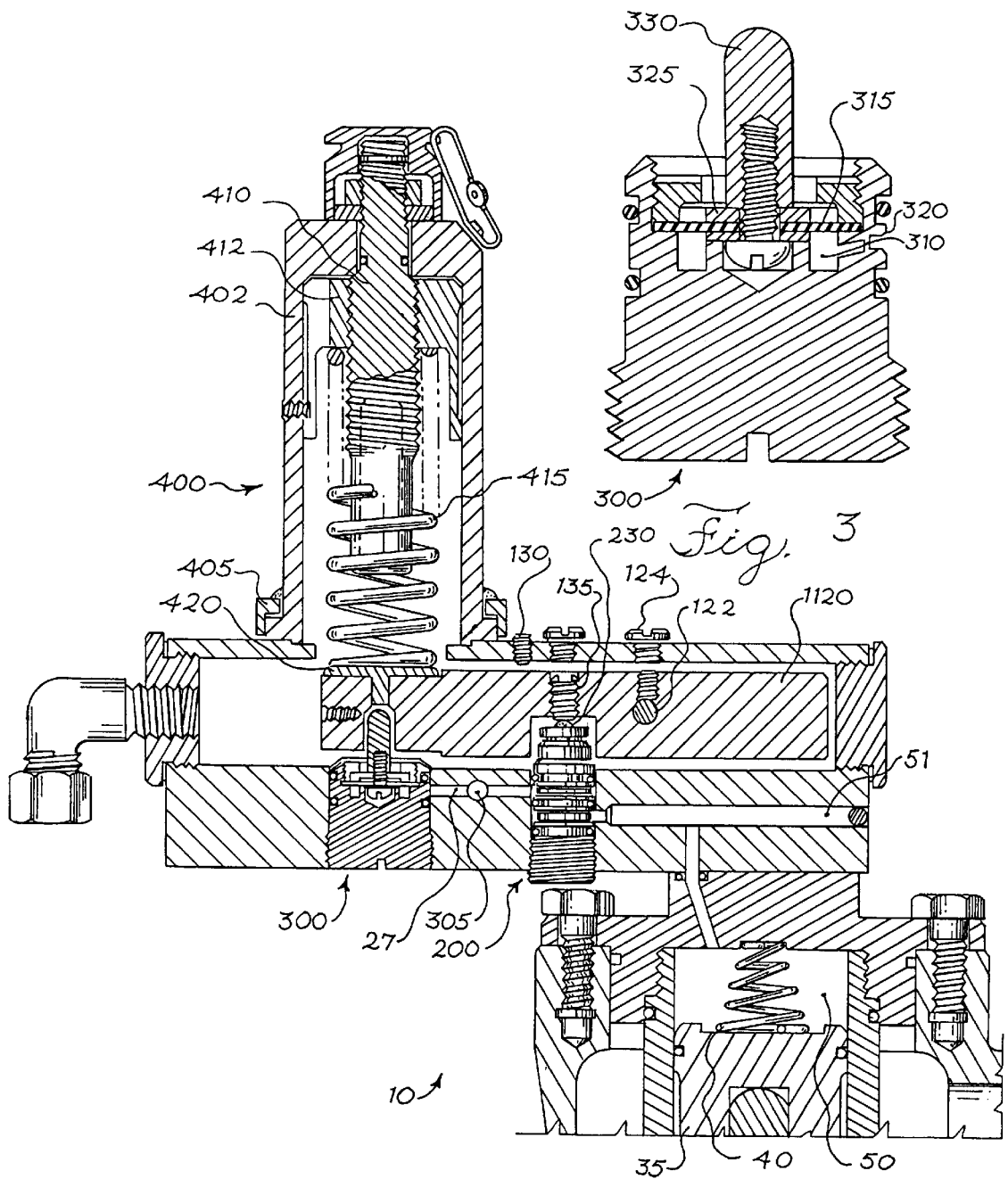
FIG. 3 is a cross-sectional view of a first preferred input pressure module that is used in the modulating relief valve of FIG. 1.

Referring to FIG. 3, a first preferred input pressure module 300 is shown. Input pressure module 300 senses system pressure through inlet port 305 and passageway 27. System fluid then enters cavity 310, and applies pressure to diaphragm 315. Diaphragm 315 is supported by plate members 320 and 325. Pin 330 extends through the center of diaphragm 315 on one end, and on another end pin 330 contacts beam 120. Pin 330 delivers a first force to beam 120 that is proportional to the system pressure. The term "proportional" as used throughout this entire document it is not meant to imply mathematical precision; rather, "proportional" as used throughout this document is intended to indicate that as one variable increases, another variable increases, too. In the context of FIG. 3, "proportional" means that as system pressure increases, the first force increases and as system pressure decreases, the first force decreases.

In modulating relief valve 5 from the perspective shown in FIG. 1 in which the input pressure module 300 is below and to the left of the pivot rod 122, the first force would bias beam 120 to rotate in a clockwise direction about pivot rod 122. It is conceivable that one of skill in the art could arrange the subassemblies of modulating relief valve 5 differently so that the first force biases beam 120 in a counterclockwise direction. This rearrangement would only work so long as the first force tended to allow exhaust of dome pressure, and the first is opposite the second force.

Input pressure module 300 can be threaded into body 100, as shown in modulating relief valves 5. It can also be fixed in or on body 100 by other well-known means, and it can be outside body 100.

Figure 4:
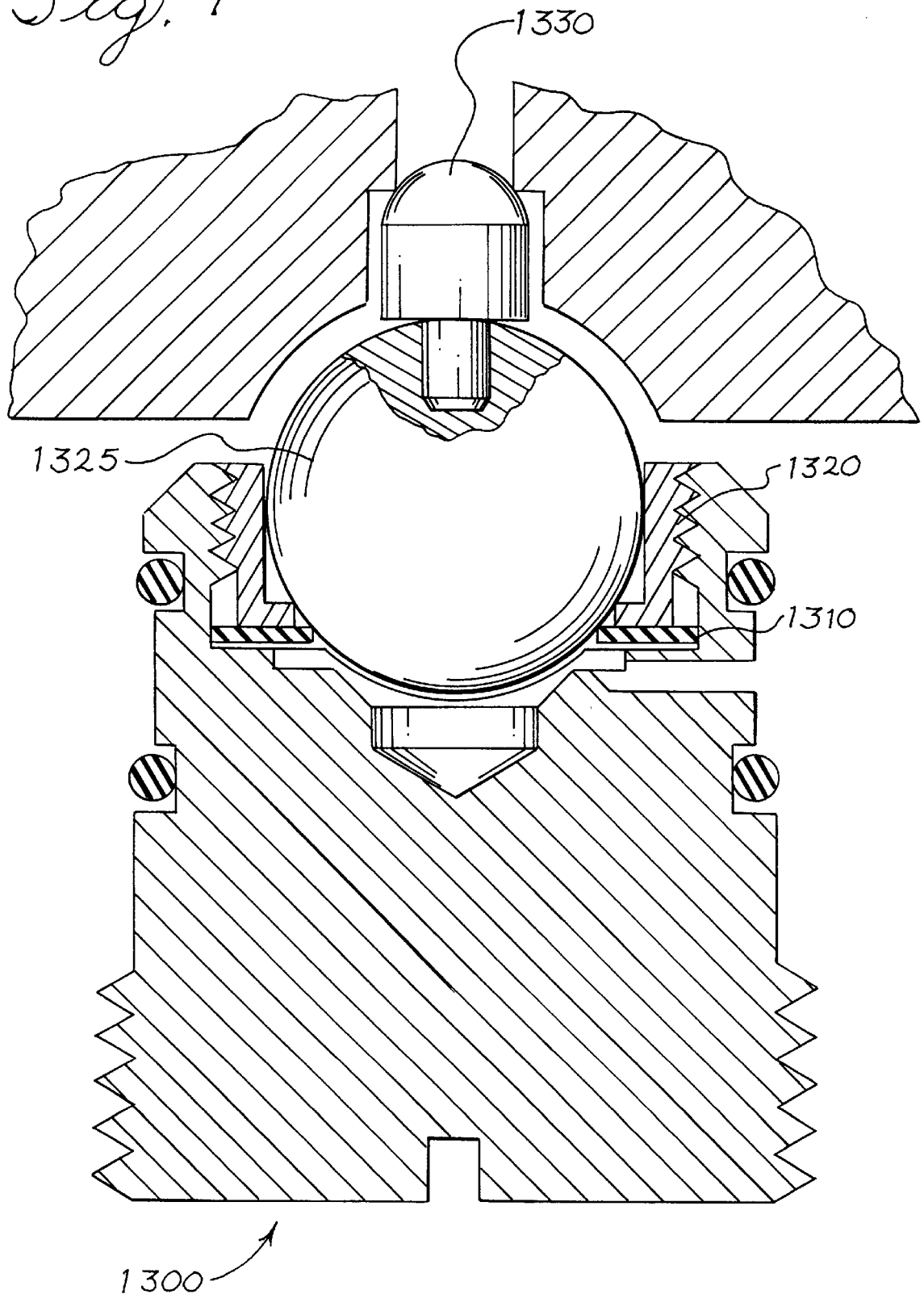
FIG. 4 is a cross-sectional view of a second preferred input pressure module that can be used in the modulating relief valve of FIG. 1.

Referring to FIG. 4, a second preferred input pressure module 1300 is shown. This preferred input pressure module 1300 has a very low spring rate with a relatively constant effective surface area system capable of working with pressures as high as 3750 psi. This input pressure module 1300 is preferred for use when the set-point pressure exceeds 300 psi.

Input pressure module 1300 senses system pressure through inlet port 305 and passageway 27. The system pressure than acts against annular flexible disk 1310 and sealing member 1325, which sits in annular flexible disk 1310 and support member 1320 to form an airtight joint between disk, 1310 and sealing member 1325. In a preferred embodiment, annular flexible disk 1310 is 0.020 to 0.030 inches thick, and is made of 90 durometer VITON or urethane. In a preferred embodiment, sealing member 1325 is a steel ball because of the high level of smoothness of commercially available steel balls.

Optionally, to ensure the joint between disk 1310 and sealing member 1325 is airtight, a thin film (not shown) of urethane (or another elastomer with similar flexibility and temperature endurance characteristics) can be added under disk 1310 and sealing member 1325. By "thin," it is mean that the film should have a thickness of less than 0.010 inches. Preferably, the thin film is from about 0.005 to about 0.010 inches thick. An airtight seal between the inside diameter of disk 1310 and sealing member 1325 can be obtained by machining or by lapping the edge of the disk 1310. Fabricating the airtight joint is a well developed art at Mercer Valve Co., Inc. and elsewhere.

Sealing member 1325 has force delivery mechanism 1330 attached to it. Force delivery mechanism 1330 delivers a first force (as defined above) to beam 120 that is proportional (as defined above) to the system pressure.

Figure 5:
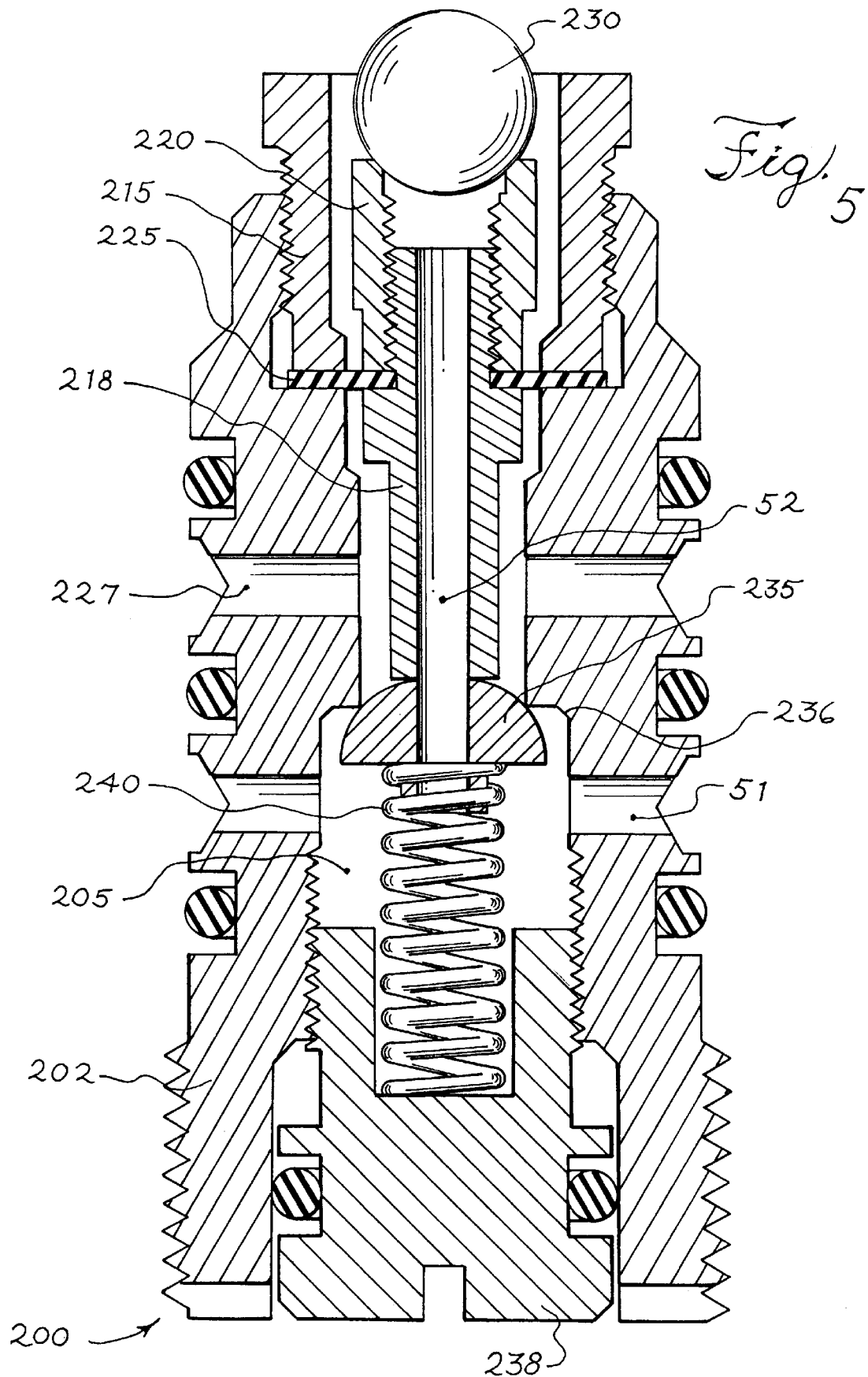
FIG. 5 is a cross-sectional view of a first preferred control valve that is used in the modulating relief valve of FIG. 1.

Referring to FIG. 5, a preferred control valve 200 is shown. Control valve 200 is similar to a structure that is well known in the pneumatic and hydraulic arts for controlling competing pressures in low ranges such as under 30 psi. An example of such a control valve is described in Norman et al., U.S. Pat. No. 3,201,042. As used in this invention, control valve 200 balances system pressure and dome pressure with respect to a set-point pressure. Using a "force balance" principle, most of the components of control valve 200 are largely independent of dome pressure and system pressure. This way, only a particular component of control valve 200, exhaust valve member 230, is acted on by changes in dome pressure on one hand and by beam 120 on the other hand. Thus, the beam acts on exhaust valve member 230, and exhaust valve member 230 acts on the beam. Notably, in the embodiments drawn, only a 0.002 inch downward movement of control valve member 230 is needed to open control valve 200 for re-pressurizing, and any lift of exhaust valve member can lead to the opening of main valve member 30.

Control valve 200 has body 202 with inner cavity 205. Passageway 27 allows system pressure into cavity 205 so that it presses against diaphragm 225, which can be clamped to control valve body 202 by a retention nut or other well-known means. Diaphragm 225 is preferably made out of a high strength plastic film including but not limited to DuPont's KAPTON, PEEK (polyetheretherketone), and urethane products. It can also be made of an elastomeric sheet or a stainless steel sheet that is about 0.002 inches thick. These materials allow diaphragm 225 to withstand pressures up to about 3750 psi.

A moveable, longitudinal stem that comprises members 218 and 220 is shown positioned into control valve body 202 by clamping diaphragm 225 with retention nut 215. The stem has longitudinal passageway 52 therein, which is in fluid communication with dome connection port 51. Dome pressure passes through longitudinal passageway 52 and applies an additional force on valve member 230 (which is the principle force acting on valve member 230), tending to allow dome pressure to exhaust.

The stem has a first end, where supply poppet 235 is affixed to the stem. Supply poppet 235 is shown in a closed position where supply poppet 235 seals a part of cavity 205 so that there is no fluid communication between passageway 27, inlet 227, and dome connection port 51 because supply poppet 235 abuts body 202 at seat 236. The point of contact between supply poppet 235 and seat 236 can be metal-to-metal or metal-to-elastomer. An elastomeric material can be molded to the end of the stem upon which supply poppet 235 sits to provide the metal-to-elastomer contact. Supply poppet 235 is preferably a half metal ball, but can be a plastic or elastomeric half or full ball, or a metal full ball, depending on the temperature requirements of the specific environment.

Supply poppet 235 also has an open position where the supply seat does not abut body 202 at seat 236. In the open position, there is fluid communication between inlet port passageway 27 and dome connection port 51. The open position is not shown in FIG. 5.

The stem has a second end where member 220 functions as an exhaust seat. Exhaust valve member 230 normally seals the exhaust seat in a closed position. The point of contact between exhaust valve member 230 and the exhaust seat can be metal-to-metal or metal-to-elastomer. An elastomeric material can be molded to the end of the stem upon which the exhaust valve member 230 sits to provide the metal-to-elastomer contact. Exhaust valve member 230 is preferably a metal ball but can be a plastic or elastomeric ball, depending on the temperature requirements of the specific environment.

Beam 120 normally biases exhaust valve member 230 to seal the exhaust seat. Beam 120 has a point of contact with exhaust valve remember 230 where set screw 135 is located. Set screw 135 is preferably flat-ended, and is accessible from outside body 100. This allows manual adjustments for different sizes of exhaust valve members 230. Screw 135 also ensures that the point of contact between exhaust valve member 230 is essentially on a center line of beam 120.

Exhaust valve member 230 also has an open position where it no longer seals the exhaust seat. In the open position, dome pressure exhausts through longitudinal passageway 52 and out of the exhaust seat. The open position is not shown in FIG. 5.

The stem moves when forces push up or down on the stem Spring 240 biases the stem so that supply poppet 235 abuts body 202 at seat 236. Spring 240 presses against supply poppet 235 at one end, and presses against adjustment screw cap 238 at another end. Spring 240 can be affixed to either or both of supply poppet 235 and adjustment screw cap 238. For example, spring 240 can be friction-fitted into adjustment screw cap 238. The sensitivity of the control valve can be manually adjusted by tightening or loosening adjustment screw cap 238 to set spring 240 to a chosen tension. Normally, the spring 240 is adjusted to a slight compression.

Referring again to FIG. 5, the control stem comprising members 218 and 220 is designed to be substantially independent of system pressure and dome pressure. It achieves this near-independence because as the system pressure acts against the stem at diaphragm 225 in one direction, the system pressure force acts against the stem in the opposite direction at supply poppet 235. A similar situation occurs for dome pressure. Dome pressure acts downward against the upper portion of the stem below valve member 230 and dome pressure acts upward against the stem below supply poppet 235. These competing forces nearly cancel each other out. Thus, the movement of stem (and attached supply poppet 235) are largely independent of system pressure and dome pressure.

This way, the primary pressure inside control valve 200 acting to open valve member 230 is dome pressure, and the primary force acting to close valve member 230 is the force from beam 120. The role of the spring 240 as a force within control valve 200 is intended to be minimal.

Control valve 200 can be threaded into body 100, or otherwise fixed in or to body 100.

Figure 6:
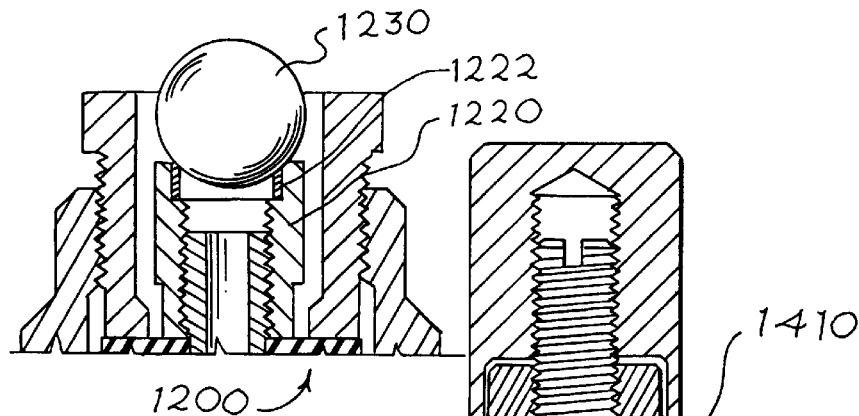
FIG. 6 is a cross-sectional view of a portion of a second preferred control valve that can be used in the modulating relief valve of FIG. 1.

Referring to FIG. 6, control valve 1200 is exactly the same as control valve 200 of FIG. 5 except that it contains a thin film of elastomeric material 1222. The thin (as defined above) film 1222 can be urethane or another elastomer with similar flexibility and temperature endurance characteristics. It can be molded or otherwise attached to member 1220. Preferably, the thin film is from about 0.005 to about 0.010 inches thick. Using thin film 1222, valve member 1230 forms a more perfect seal at 1220 when dome pressure is being prevented from exhausting.

Referring to FIG. 7, another important variation of a modulating relief valve is shown. Modulating relief valve 10 is substantially the same as modulating relief valve 5. The primary difference is that modulating relief valve 10 does not include the rod 55 and spring 110 negative feedback system, and beam 1200 of modulating relief valve 10 is of a slightly different shape than beam 120 of modulating relief valve 5. Modulating relief valve 10 achieves modulation like modulating relief valve 5, but it is less accurate than modulating relief valve 5 because its modulation is proportional only to the dome pressure and rather than to the combination of the dome pressure and the amount of movement of main valve member 30. Another difference in modulating relief valve 10 is that it employs a stopper mechanism, screw 130, to prevent beam 120 from rotating too far about pivot rod 122 in the clockwise direction.

Referring to FIG. 8, another important variation of a modulating relief valve is shown. In FIG. 8, modulating relief valve 15 is configured In a stacked arrangement, and no beam is used in the arrangement. Modulating relief valve 15 works for the same pressure vessels as does modulating relief valves 5 and 10, and it uses the same control valve 200 subassembly used in modulating relief valves 5 and 10. This means that dome pressure acts on the surface area valve member 230 creating a force, referred to as in additional force, tending to push valve member 230 open so that the dome pressure can exhaust.

Modulating relief valve 15 also uses a similar mechanism for setting a set-point pressure as the subassemblies used in modulating relief valves 5 and 10. As shown, mechanism 1400 contains screw 1410, which pushes down against spring 1415 and force delivery mechanism 1420. Force delivery mechanism 1420 delivers the second force that tends to keep valve member 230 closed so dome pressure cannot exhaust.

Modulating relief valve 15 has a system for sensing system pressure that is slightly different from modulating relief valves 5 and 10. Input pressure is sensed through passageway 29, and it pushes against diaphragm 510, which is connected to diaphragm 520 through pin 515. This creates a first force tending to push against the second force to allow dome pressure to exhaust. Note that the surface area upon which the system pressure can act on diaphragm 510 is larger than the surface area of diaphragm 520, upon which the system pressure can act. This tends to counter the first force acting on diaphragm 510 and keep exhaust valve member 230 closed so dome pressure cannot exhaust.

For valve member 230 to open in the stacked arrangement, the force acting on diaphragm 510 plus the force from the dome pressure acting on valve member 230 must overcome the force from the set-point pressure and the force acting on diaphragm 520.

DESCRIPTION OF OPERATION OF THE PREFERRED EMBODIMENTS

WHEN SET-POINT PRESSURE EXCEEDS SYSTEM PRESSURE

When the set-point pressure exceeds system pressure, which is the normal operating condition, all embodiments of the present invention prevent exhaust of system pressure and dome pressure, and allow re-pressurizing. The re-pressurizing is carried out in a modulating way, such that is proportional to the amount by which the set-point pressure exceeds the system pressure. The control valve 200 drives this process by the way it controls the competing forces.

Referring to FIGS. 1 and 5, input pressure module 300 applies a first force to beam 120, pushing 120 to rotate in a clockwise direction. set-point bonnet 400 applies a second force to beam 120 that is proportional to the set-point pressure and exceeds the first force. The second force causes beam 120 to rotate about pivot rod 122 to in a counterclockwise direction. This rotation causes beam 120 to push down exhaust valve member 230. Then, dome pressure cannot exhaust through exhaust seat at 220, and dome pressure keeps main valve member 30 closed so that system pressure cannot exhaust through outlet 31.

When beam 120 is in the fully counterclockwise position because set-point pressure so exceeds system pressure, supply poppet 235 is open. This also allows fluid communication between passageway 27, inlet port 227, and dome connection port 51 so re-pressurizing can occur.

If the system pressure in the pressure vessel rises to just above the set-point pressure, the system pressure produces a force in the input pressure module 300 that just exceeds the force applied to beam 120 by the set-point pressure. Beam 120 rotates slightly clockwise about pivot rod 122 so that the reaction force in input pressure module 300 and at the exhaust seat and the end of the stem reach zero. At this point, supply poppet 235 has closed, isolating the dome pressure from the system pressure. As the system pressure rises further, the dome pressure stays constant.

Referring to the input pressure module 1300 of FIG. 4, sealing member 1325 is resting when the set-point pressure exceeds the system pressure. As the system pressure rises to set-point pressure, sealing member 1325 starts to raise due to the system pressure sensed through passageway 27. As sealing member 1325 rises, annular flexible disk 1310 travels with sealing member 1325 remaining in an airtight sealing engagement. The sealing engagement remains airtight so long as sealing member moves no more than about 0.030 inches.

When all of the competing forces are again in balance, all embodiments of the claimed modulating relief valve will assume a neutral position for at least a passing moment.

The Neutral Position

All of the embodiments of the present invention have a neutral position when all the competing forces are substantially in balance. In the neutral position, main valve member 30 seals inlet 25 so there is no exhaust of system pressure. Further, exhaust valve member 230 seals the exhaust seat at 220 so there is no exhaust of dome pressure. Finally, supply poppet 235 is in a closed position so that system pressure is not in fluid communication with dome pressure. The modulating relief valve of the present invention does not typically stay in the neutral position for long. Instead, the modulating relief valve tends to spend most of its time in positions where set-point pressure exceeds system pressure.

When System Pressure Exceeds Set-Point Pressure

When the system pressure exceeds set-point pressure, all embodiments of the present invention allow exhaust of dome pressure and exhaust of system pressure, and all embodiments prevent re-pressurizing. The exhausting of the system pressure is done in a modulating way, such that the amount of system pressure that is permitted to exhaust is proportional to the amount by which the system pressure exceeds the set-point pressure. This is accomplished by allowing the main valve member 30 to move off of inlet 25 by an amount proportional to the excess pressure.

Referring to FIG. 1, when system pressure exceeds set-point pressure, input module 300 applies a first force to beam 120 sufficient to cause beam 120 to rotate about pivot rod 122 in a clockwise direction. This relieves the pressure that beam 120 was applying to exhaust valve member 230. As this occurs, supply poppet 235 closes and exhaust valve member 230 opens (mostly as a result of the dome pressure pushing against exhaust valve member 230) from the exhaust valve seat at 220 and allows dome pressure to exhaust. As the dome pressure exhausts, dome pressure in dome 50 decreases, which allows piston 35 and main valve member 30 to rise. Then, system pressure can escape through outlet 31. In other words, the lower the dome pressure and the greater the system pressure, the more main valve member 30 will open.

Piston 35 has a greater effective surface area than does main valve member 30, as described above in "Detailed Description of the Drawings and Preferred Embodiments of the Invention." Generally, the dome pressure must be reduced to approximately 70% of the system pressure for the main valve member 30 to begin to rise. This percentage depends on the ratio of the effective surface areas, so this percentage is adjustable by adjusting the relationship among the size of these effective surface areas. Note that spring 40 also acts to keep main valve member sealed, although, when dome pressure is particularly high, the force from spring 40 is negligible.

The rate at which the dome pressure can be exhausted is proportional to the distance that exhaust valve member 230 is lifted from seat 220. This is controlled by the position of beam 120. The greater the amount that the system pressure exceeds the set-point pressure, and the higher the dome pressure remains, the more clockwise rotation is imparted to beam 120, allowing exhaust valve member 230 to rise further. Conversely, as the amount the set-point pressure is exceeded starts to drop off, the rate at which dome pressure is exhausted also decreases, and the beam 120 will not be rotated quite as far.

By this process of proportionately reducing the dome pressure and then reducing the system pressure, a series of equilibrium points can be reached where the outflow from outlet 31 matches the inflow to the main pressure vessel. It is preferred that the maximum main relief valve outflow is designed so that it exceeds the maximum possible inflow into the main pressure vessel. Preferably, the design is such that the system pressure can never exceed the set-point pressure by about 10%.

There are two negative feedback systems in FIG. 1 that allow modulating relief valve 5 to modulate. The first negative feedback is present in every embodiment of the present invention. It results from the fact that dome pressure acts on exhaust valve member 230. As the exhaust valve member opens in response to the excess system pressure, dome pressure exhausts, thereby decreasing dome pressure. This tends to close exhaust valve member 230 on exhaust valve seat at 220. This limits the extent to which dome pressure is reduced, which in turn limits the amount that system pressure has to fall before dome pressure will again push down on piston 35 and close main valve member 30.

The second negative feedback system is shown in the embodiment of FIG. 1. It involves spring 110 and rod 55. This negative feedback system comes into play when the excess system pressure has caused main valve member 30 to rise. When this occurs, piston 35 and rod 55 and bushing 105 rise, compressing spring 110 where spring 110 pushes against bushing 115 into rod 120. The spring pushes beam 120 into a counterclockwise position, tending to close on exhaust valve member 230 so that dome pressure cannot exhaust. As a result, dome pressure in dome 50 remains constant so that piston 35 cannot rise further until the system pressure rises further, which allows input pressure module 300 to counteract the force of spring 110 and allow the beam 120 to rotate in the clockwise direction.

By these feedback systems, main valve member 30 modulates. That is, valve member 30 lifts in proportion to the amount by which system pressure exceeds set-point pressure. The values of the various elements in the system can be proportioned so that main valve member 30 attains a full lift position when system pressure exceeds set-point pressure by 10% or less.

When system pressure drops sufficiently, beam 120 rotates in a counterclockwise direction that re-closes exhaust seat at 220 and simultaneously opens supply poppet 235. This action allows system pressure to again pressurize the dome, which re-closes main valve member 30, and modulating relief valve 5 is back in its neutral position.

Referring to FIG. 7, modulating relief valve 10 works just like modulating relief valve 5 of FIG. 1 except that modulating relief valve 10 does not have the second negative feedback system described above in reference to FIG. 1.

Without the second negative feedback system, main valve member 30 can achieve a full lift position when system pressure exceeds set-point pressure by about 2–5% or less. However, accuracy of the modulation is reduced. For example, without spring 110, friction caused by main valve member 30 play a greater part in the gradual lift. Reseating of main valve member 30 is typically 2–3% below set-point pressure, but it can be less based on the proportioning of the effective surface areas in the modulating relief valve.

Referring to FIG. 8, modulating relief valve 15 works similarly to modulating relief valve 10 except that it does not use a beam. Modulating relief valve 15 works with a pressure vessel like the one shown in FIG. 1. It senses system pressure through tubing 26 (as shown in FIG. 1), and it senses dome pressure through dome connection 51 that communicates directly with control valve 200. Modulating relief valve 15 uses the same control valve 200 as does modulating relief valve 5 and 20, having a control stem that is substantially independent of system pressure and dome pressure.

In modulating relief valve 15, when system pressure exceeds set-point pressure, system pressure pushes against diaphragm 510, causing it lo rise. System pressure also acts on diaphragm 520, which has a smaller effective surface area than diaphragm 510. This allows exhaust valve member 230 to stay seated until the force on diaphragm 510 is large enough to overtake the force on diaphragm 520 and the force caused by the mechanism for setting a set-point pressure, in this case, set-point bonnet 1400.

When the system pressure is large enough to overtake the countering forces, it allows exhaust valve member 230 to rise. Dome pressure pushes against exhaust valve member 230 so that it does so rise and allows dome pressure to exhaust. This decreases dome pressure in dome 50 (as shown in FIG. 1) and allows piston 35 (as shown in FIG. 1) to rise, causing system pressure to exhaust through outlet 31 (as shown in FIG. 1). This embodiment modulates because it employs the first negative feedback system described above in reference to FIG. 1.

Advantages

The embodiments of the present invention provide a modulating relief valve with improved precision in its modulation that is capable of handling high pressures. It does this through improved negative feedback systems that reduce the role of friction due to moving parts that previously interfered with accurate modulation. The embodiments of the present invention use fewer rubber o-rings around moving parts, so it has less leakage than previous modulating relief valves. The embodiments of the present invention allow the use a thin elastomeric or plastic or stainless steel film to create mobile airtight seals that have less leakage than other modulating relief valves, and a relative constant effective surface area due to the airtight seals.

Scope

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is therefore indicated by the appended claims rather than by the foregoing description. All changes which come within the meaning and range of equivalency of the claims are embraced to be within their scope.

What is claimed is:

1. A modulating relief valve for use on a pressure vessel having a system pressure, the modulating relief valve comprising:
   a) a main relief valve having:
      i) an inlet subject to the system pressure,
      ii) an outlet,
      iii) a valve member normally sealing the inlet,
      iv) a piston that rises and falls with the valve member, and
      v) a dome adjacent to the piston, the dome having a dome pressure; and
   b) a dome pressure control system attached to the main relief valve, the dome pressure control system having:
      i) a body
      ii) a beam inside the body attached to the body at a pivot point,
      iii) an input pressure module creating a first force on the beam, the first force being related to the system pressure and tending to rotate the beam in a first direction,
      iv) a mechanism for setting a set-point pressure, the set-point pressure creating a second force on the beam, tending to rotate the beam in a second direction opposite the first direction, and
      v) a control valve that exerts an additional force on the beam tending to rotate the beam in the first direction, the additional force having one component that is related to the dome pressure, the control valve allowing dome pressure to be exhausted when the beam is rotated in the first direction thereby allowing the main valve member to open, and the control valve allowing system pressure to pressurize the dome when the beam is rotated in the second direction.

2. The modulating relief valve of claim 1 wherein the beam has a width and a longitudinal axis, and the pivot point by which the beam is supported comprises a pivot rod that extends through the width of the beam substantially perpendicular to the longitudinal axis of the beam, the rod being supported in the body of the dome pressure control system.

3. The modulating relief valve of claim 2 wherein the rod is supported in the body by at least one mechanical fastener.

4. The modulating relief valve of claim 1 wherein when the beam rotates in the first direction, the beam rotates clockwise about the pivot point from a perspective wherein the input pressure module is below and to the left of the pivot point, and when the beam rotates in the second direction, the beam rotates counterclockwise about the pivot point.

5. The modulating relief valve of claim 4 further comprising a stopper mechanism wherein when the beam rotates clockwise, the stopper mechanism limits how far the beam can rotate in the clockwise direction.

6. The modulating relief valve of claim 5 wherein the stopper mechanism is a screw extending through the housing of the dome pressure control system.

7. The modulating relief valve of claim 1 wherein the input pressure module comprises:
   a) an inlet port in fluid communication with the system pressure
   b) an annular flexible disk, and
   c) a sealing member resting on the disk, such that the disk and sealing member rise and fall together with changes in system pressure without leakage, and such that the system pressure applies an input force against the disk and sealing member, which in turn applies the first force to the beam.

8. The modulating relief valve of claim 1 wherein the input pressure module comprises:
   a) an inlet port in fluid communication with the system pressure,
   b) a diaphragm that senses the system pressure,
   c) a first plate above the diaphragm,
   d) a second plate below the diaphragm,
   e) a pin through the diaphragm, and
   f) a plate member connected with the pin, such that the diaphragm and the first and second plate members rise and fall together with changes in system pressure, and such that the system pressure applies an input force against the diaphragm, pin, and the first and second plate members, which in turn apply the first force to the beam.

9. The modulating relief valve of claim 1 wherein the input pressure module is threaded into the body of the dome pressure control system.

10. The modulating relief valve of claim 1 wherein the mechanism for setting the set-point pressure is in a bonnet housing attached to the body of the dome pressure control system.

11. The modulating relief valve of claim 1 wherein the mechanism for setting the set-point pressure comprises:
   a) a bonnet housing,
   b) a set screw having a portion in the bonnet housing and a portion out of the bonnet housing, and
   c) a set-point spring having a first end upon which the set screw applies a set screw force, and the set-point spring having a second end that applies the second force to the beam.

12. The modulating relief valve of claim 1 wherein the control valve has a neutral position in which an exhaust valve member is closed on an exhaust seat preventing the dome pressure from being exhausted, and a supply seat is closed preventing the system pressure from pressurizing the dome.

13. The modulating relief valve of claim 1 wherein the control valve comprises:
   a) an inner cavity,
   b) an inlet allowing system pressure into the inner cavity,
   c) a dome connection port connecting the dome with the inner cavity,
   d) a stem having a longitudinal passageway therethrough in fluid communication with the dome connection port, the stem having a supply poppet thereon and the stem being moveable in the cavity between an open position in which the inlet port is in fluid communication with the dome connection port and a closed position wherein the supply seat seals the cavity between the inlet port and the dome connection port, and
   e) an exhaust valve member normally biased by the beam into a closed position in which the valve member seals the inner cavity thereby preventing dome pressure from exhausting of dome pressure through the inner cavity, and an open position in which the exhaust valve member does not seal the inner cavity and allows dome pressure to exhaust through the inner cavity.

14. The modulating relief valve of claim 13 wherein the stem's movement is substantially independent of system pressure and dome pressure.

15. The modulating relief valve of claim 1 wherein the control valve is threaded into the body of the dome pressure control system.

16. A modulating relief valve for use on a pressure vessel having a system pressure, the modulating relief valve comprising:
   a) a main relief valve having:
      i) an inlet subject to the system pressure,
      ii) an outlet,
      iii) a valve member sealing said inlet under normal conditions,
      iv) a piston that rises and falls with the valve member, and
      v) a dome adjacent to the piston, the dome having a dome pressure; and
   b) a dome pressure control system attached to the main relief valve, the dome pressure control system having:
      i) a body
      ii) a beam inside the body attached to the body at a pivot point,
      iii) an input pressure module creating a first force on the beam, the first force being related to the system pressure and tending to rotate the beam in a first direction,
      iv) a mechanism for setting a set-point pressure, the set-point pressure creating a second force that acts on the beam, tending to rotate the beam in a second direction opposite the first direction,
      v) a control valve that exerts an additional force on the beam tending to rotate the beam in the first direction, the additional force having one component that is related to the dome pressure, the control valve allowing dome pressure to be exhausted when the beam is rotated in the first direction thereby allowing the main valve member to open, and the control valve allowing system pressure to pressurize the dome when this beam is rotated in the second direction, and
      vi) a negative feedback system comprising a spring, the spring having a first end creating a third force on the beam tending to rotate the beam in the second direction, the spring having a second end acting against a rod attached to the piston, whereby when the piston rises, the rod compresses the spring, and the spring pushes the beam in the second direction to prevent exhaust of dome pressure until the system pressure causes the piston to rise again.

17. The modulating relief valve of claim 16 wherein the negative feedback system reduces the significance of friction force in modulation.

18. A modulating relief valve for use on a pressure vessel having a system pressure, the modulating relief valve comprising:
   a) a main relief valve having:
      i) an inlet subject to the system pressure,
      ii) an outlet,
      iii) a valve member normally sealing the inlet,
      iv) a piston that rises and falls with the valve member, and
      v) a dome adjacent to the piston, the dome having a dome pressure; and
   b) a dome pressure control system attached to the main relief valve, the dome pressure control system having:
      i) a body,
      ii) an input pressure module at least partially in the body creating a first force proportional to the system pressure and tending to allow dome pressure to exhaust,
      iii) a mechanism for setting a set-point pressure, the set-point pressure creating a second force tending to prevent dome pressure exhaust, and
      iv) a control valve having an exhaust valve seat and an exhaust valve member against which the dome pressure applies a net force, the control valve being at least partially in the body, wherein an additional force tends to allow exhaust of the dome pressure by tending to remove the exhaust valve member from the exhaust valve seat, the additional force having one component that is proportional to the dome pressure, the control valve allowing dome pressure to be exhausted when there is a difference between the system pressure and the set-point pressure such that the first force and the additional force exceed the second force, thereby allowing the main valve member to open an amount, the amount the main valve opens being proportional to the difference between the system pressure and the set-point pressure, and the control valve allowing system pressure to pressurize the dome when the second force exceeds the sum of the first force and the additional force.

19. The modulating relief valve of claim 18 wherein the body contains at least one diaphragm, and the first force acts on the at least one diaphragm in one direction and the second force acts on the at least one diaphragm in a direction opposite the first direction.

20. The modulating relief valve of claim 18 wherein the input pressure module comprises:
   a) an inlet port in fluid communication with the system pressure,
   b) a first diaphragm that senses system pressure on a first surface area, and
   c) a second diaphragm that senses system pressure on a second surface area, the second surface area being smaller than the first surface area, disk, wherein the system pressure applies a first force on the first surface area and a competing force to the second surface area such that the first force must overcome competing force to allow exhaust of dome pressure.

21. The modulating relief valve of claim 18 wherein the mechanism for setting a set-point pressure is attached to the body of the dome pressure control system such that the mechanism is substantially directly over the control valve in a stacked arrangement.

22. The modulating relief valve of claim 21 wherein the exhaust valve member is a ball.

* * * * *

UNITED STATES PATENT AND TRADEMARK OFFICE
CERTIFICATE OF CORRECTION

PATENT NO. : 6,161,571  
DATED : December 19, 2000  
INVENTOR(S) : Wesley Taylor Page 1 of 1

It is certified that error appears in the above-identified patent and that said Letters Patent is hereby corrected as shown below:

<u>Title page,</u>  
ABSTRACT,  
Line 4, delete "wit" and substitute -- with -- in its place.  
U.S. PATENT DOCUMENTS, in the Powell reference substitute -- 10/1992 -- in its place.

<u>Column 12,</u>  
Line 58, immediately after "pressure" insert -- , -- (comma).

<u>Column 14,</u>  
Line 12, immediately after "body" insert -- , -- (comma).  
Line 31, delete "this" and substitute -- the -- in its place.

Signed and Sealed this

Twenty-eighth Day of May, 2002

*Attest:*

JAMES E. ROGAN  
*Attesting Officer*  *Director of the United States Patent and Trademark Office*